United States Patent [19]

Markow et al.

[11] 4,220,685
[45] Sep. 2, 1980

[54] PASSIVE FIRE PROTECTION SYSTEM

[75] Inventors: Edward G. Markow, Oakdale; John R. Penn, III, Jamaica, both of N.Y.

[73] Assignee: Grumman Aerospace Corporation, Bethpage, N.Y.

[21] Appl. No.: 925,944

[22] Filed: Jul. 19, 1978

[51] Int. Cl.² .......................... E06B 5/16; E04B 1/94; B32B 15/04
[52] U.S. Cl. ..................................... 428/103; 52/404; 52/455; 52/506; 52/573; 52/630; 52/DIG. 5; 165/135; 165/136; 428/332; 428/457; 428/920; 428/921
[58] Field of Search ............... 428/920, 921, 457, 332, 428/336, 103; 52/455, 573, 506, 404, 630, 811, DIG. 5; 165/134 R, 135, 136; 220/215

[56] References Cited

U.S. PATENT DOCUMENTS

| 878,341 | 2/1908 | Cahill | 428/921 X |
|---|---|---|---|
| 982,303 | 1/1911 | Saino et al. | 52/455 |
| 1,151,289 | 8/1915 | Saino | 52/232 |
| 2,100,895 | 11/1937 | Austin | 220/440 |
| 2,945,653 | 7/1960 | Atkin | 52/573 X |
| 3,844,878 | 10/1974 | Price | 428/921 X |
| 4,119,755 | 10/1978 | Hoyer | 428/920 X |

Primary Examiner—Harold Ansher
Attorney, Agent, or Firm—Mellor A. Gill

[57] ABSTRACT

A passive system for protecting a structure against high temperatures which consists of a thin protective foil of heat-resistant material such as stainless steel fastened to the face of the structure to be protected. When subjected to high heating rates, the local thermal expansion of the foil forms a blister bulging away from the structure to thereby create an air space which thermally insulates the structure.

12 Claims, 5 Drawing Figures

FIG.4
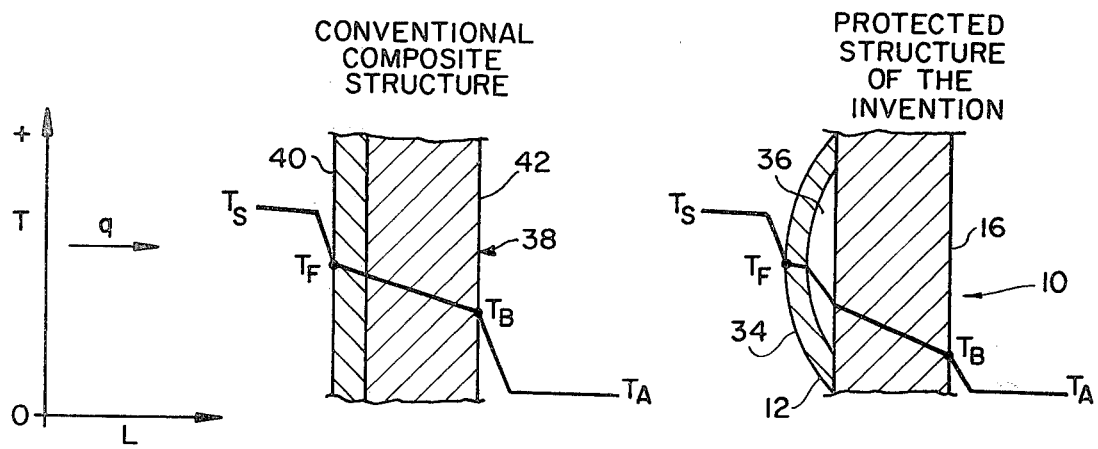
ONE DIMENSIONAL TEMPERATURE DISTRIBUTION
T = TEMPERATURE
$T_A$ = AMBIENT TEMPERATURE
$T_B$ = BACK FACE TEMPERATURE
$T_F$ = FRONT FACE TEMPERATURE
$T_S$ = SOURCE TEMPERATURE
L = DISTANCE
q = HEAT ENTERING SYSTEM
t = TIME
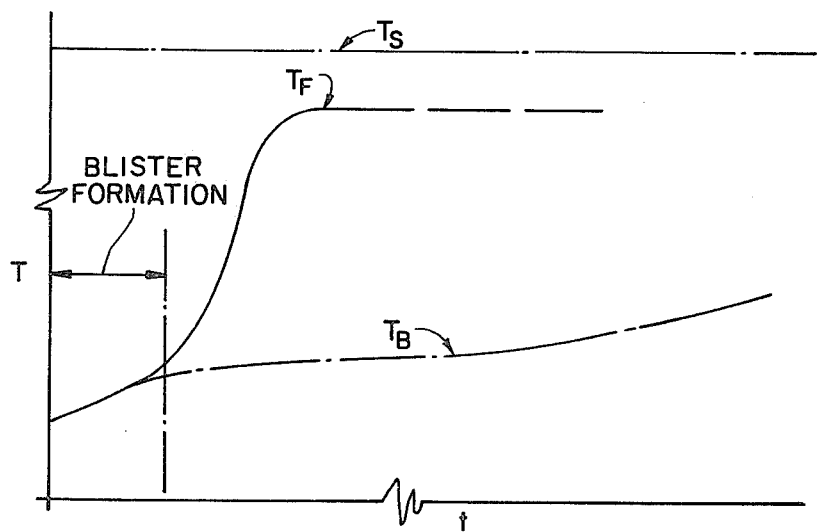
TEMPERATURE TREND
FIG.5

PASSIVE FIRE PROTECTION SYSTEM

BACKGROUND OF THE INVENTION

1. Field of the Invention

The present invention relates to a fire protection system and, more particularly, to a passive system in which the protective means is a thin heat-resistant metal foil fastened to the surface to be protected.

2. Summary of the Invention

There is a wide choice of suitable fire protection systems currently available if considerations of weight, volume, complexity, and cost are not of paramount importance. However, when seeking to provide protection for mobile structures such as vehicles where those considerations are overriding, the availability of suitable systems are found to be limited. A number of methods are available to protect the occupants, structure, or components of a vehicle from fuel-fed fires or from flames initiated by some outside source. These methods include fire shields, fire-resistant and ablative coatings, and fire extinguishing systems. Each of these methods has its advantages and disadvantages. One of the critical disadvantages which is common to most is volumetric encroachment; i.e., useable space in the vehicle is sacrificed to make room for the fire protection means. In addition, ancillary equipment is required with a number of these known fire protection methods to insure their integrity of operation.

A factor that makes effective fire protection in vehicles of growing importance is the increasingly widespread use of aluminum in their construction. Aluminum has a relatively high coefficient of thermal conductivity and a low melting point when compared to steel which is the more commonly used material. These physical properties of aluminum contribute adversely to a vehicle's resistance to fire when compared to steel. As a corollary to this decreased fire resistance, when aluminum is incorporated in a vehicle's structure, susceptibility to catastrophic failure is increased. Thus, any means for preventing or delaying the effects of a vehicle fire or exposure to high thermal inputs will serve to increase the probability of survival of the occupants and will minimize the structural damage sustained.

We have discovered that by attaching a thin stainless steel or similar high-temperature metal foil to a structure to be protected, such as an aluminum wall, on the face thereof that has a liability of exposure to fire or flame, that there is a thermal response in the steel foil when subjected to intense heat that serves to protect the aluminum structure. We have found that the high melting point of the stainless steel protects the foil itself from destruction and the rapid thermally induced deformation thereof forms a blister that serves to protect the aluminum structure. The blister forms an air space which acts as a thermal insulator.

3. Description of the Prior Art

In the prior art, F. L. Saino et al., in U.S. Pat. No. 982,303, and F. L. Saino, in U.S. Pat. Nos. 1,146,960 and 1,151,289, disclose a fire door or shutter having an arrangement in which a sheet of metal on the side of the door exposed to a fire bulges outward toward the fire when exposed thereto. It will be seen, however, that instead of the thin metal foil facing of the present invention, Saino et al. use a relatively thick sheet, preferably of corrugated metal. The thermal expansion of this thick sheet metal imposes loads on the structure that must be compensated for by a costly complicated articulated frame and back sheet construction. Moreover, the structure taught by Saino et al. is of a three layer design incorporating an intermediate sheet of refractory material such as asbestos, said refractory material adding to the cost and weight of the door. In addition, Saino et al. believe it necessary to provide an air channel between the layers of the door to permit a circulation of a cooling current of air therebetween and the bulging of the front sheet of their door because of thermal expansion is intended to create a large air space to thereby produce a suction of air by an "oil canning+ effect to promote the cooling air current. It will be recognized, therefore, that the fire protection system of the present invention in which a thin metal foil is fastened directly on the structure to be shielded thus avoids the cost, weight, complexity and space-wasting arrangement of Saino et al.

The use of relatively thin metal sheets in thermal protection means are disclosed by H. R. Austin, in U.S. Pat. No. 2,100,895, and C. Arne, in U.S. Pat. No. 3,279,973, however, in both of those teachings the principal objective of the inventions is to prevent or mitigate thermal expansion of the protective sheet. These inventions, it will be seen, are intended to provide stress-relieving means in metal sheets, not to purposely distort the sheet as is the case in the present invention to provide an air space for thermal insulation.

There is also a showing in the prior art by C. E. Vandenberg (U.S. Pat. No. 3,024,941) of a thermal insulation system in which a thin aluminum foil is inflated to provide vapor space thermal insulation for a structure. Unlike the present invention in which the thermal expansion of the metal of the foil itself is used to create an air space for thermal insulating purposes, Vanderberg discloses an arrangement in which the foil insulation is inflated by a thermally vaporizable material. To permit the foil to be inflated, it is formed with integral expansible convolute portions and the vaporizable material must be provided within the expansible portions when they are installed on the structure to be protected. Since the fire protection mechanism is non-repeatable, the advantages accruing from the differences of the fire protection system of this invention over Vandenberg is, therefore, believed to be obvious.

OBJECTS OF THE INVENTION

It is a principal object of the invention to provide a passive, self-contained thermal protection system having minimum and in most cases negligible volumetric requirements whose protection is maintenance free and does not degrade with time and whose action is repeatable for short-lived fire occurrences.

It is an object of the invention to provide a fire protection system that is substantially completely passive but which is activated instantaneously when subjected to a high thermal input.

It is another object of the invention to provide a passive fire protection system for vehicles, particularly those having an extensive use of aluminum in their structure, which will provide a critical margin of time for the fire to be extinguished without main structural damage and which will increase the time available for escape by the occupants.

Still another object of the invention is to provide a passive fire protection system that returns to its original state after a short duration fire and is in a condition to provide immediate protection against subsequent fires.

A further object of the invention is to provide a passive fire protection system in which it is not necessary to articulate the structure being protected or to otherwise provide means to cope with the thermal expansion of the protection system.

Yet another object of the invention is to provide a passive fire protection system that provides a shield against fire without the requirement of refractory material therein.

A still further object of the invention is to provide a passive fire protection system that has the capability of sensing and reacting automatically to thermal inputs not only of fuel fed fires, but also of electrically induced fires, electrical arc-overs, laser weaponry, thermonuclear inputs, thermal radiation shock, and the like.

DESCRIPTION OF THE DRAWINGS

For the purpose of illustrating the invention, there are shown in the drawings the forms which are presently preferred, it should be understood, however, that the invention is not necessarily limited to the precise instrumentalities and arrangements here shown.

FIG. 4 is a plot comparing the one-dimensional temperature distribution of a conventional composite structure with a structure protected by the system of the invention; and FIG. 5 is a plot showing the temperature trend with time of the fire protection system of the invention.

DESCRIPTION OF THE PREFERRED EMBODIMENTS

Figure 1:
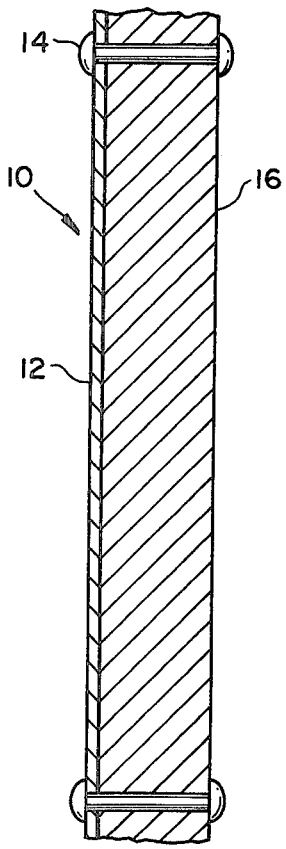
FIG. 1 is a cross sectional edge view of an embodiment of the fire protection system of the invention at normal temperatures.

Referring now to the drawings, FIG. 1 illustrates the invention embodied in a system 10 to protect a structure from fire or other heat input. System 10 includes a protective foil 12 fastened by any suitable attachment technique such as by screws, bolts, or rivets 14 to a structure 16, which can be a wall or structural subassembly, on the face thereof that has a liability of exposure to fire or heat. The structure can be the rear wall 16 of the crew compartment 18 adjacent the engine compartment 20 of a vehicle such as, for example, an armored military vehicle 22. Protective foil 12 can also be fastened to the front wall 24, side walls 26-28, and floor 30 of the crew compartment. The rivets 14 or other fastening means used are preferably made of a material like stainless steel which will provide a path of low thermal conductivity. Spacing of the rivets and rivet location can vary as required and we have used a rectangular pattern of rivets on 6- to 12-inch centers. In a typical example, the walls and floor of the crew compartment may be fabricated out of aluminum and the protective foil can be a 0.008-inch stainless steel foil. Other suitable high temperature materials such as titanium can be used for the protection foil 12 and the thickness thereof can range from 0.005- to 0.015-inch. We have found that the use of foil in this thickness range even with sheet aluminum as thin as 0.125 inch, when heated, imposed distorting stresses on the aluminum that were low enough to be negligible and compensation therefor was not indicated.

In the context of this invention, high temperatures and high thermal inputs are to be understood to mean a heat input that would damage or destroy a structure if it were not protected by the system of this invention.

It will be understood also that the terminology "high-temperature material" as applied to the protective foil used in this invention to protect a structure is intended to mean a material which has a higher resistance to heat than does the material from which the structure is constructed. As stated previously by way of example, to protect an aluminum alloy structure having a melting point of about 600° C., it is preferred to fabricate the foil out of a material such as a stainless steel which has a melting point in the range of about 1450° C. or from titanium which melts at about 1650° C.

Figure 3:
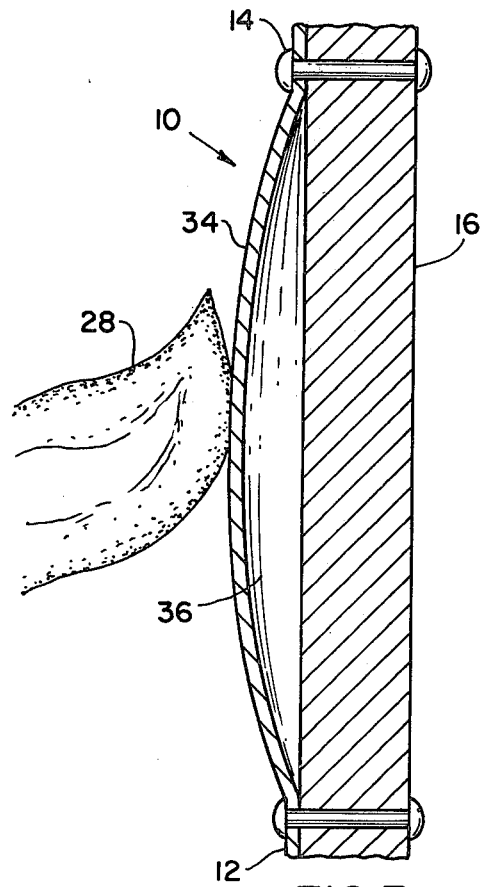
FIG. 3 is a cross sectional edge view of the embodiment of FIG. 1 exposed to a flame.

In operation, should the fire protection system 10 be subjected to a fire or high temperatures such as would be caused by a fuel fire 32 in the engine compartment 20 of the vehicle 22, thermal stresses set up in the protective foil 12 will cause the foil to distort and form blisters 34 which project outward toward the source of heat. As perhaps best shown by FIG. 3, the formation of a blister 34 causes the foil to bow away from the wall 16, forming an air space 36 separating the foil from the wall thus thermally insulating the wall and reducing the heat flow thereinto as illustrated graphically in FIGS. 4 and 5.

To illustrate how the blister phenomenon acts to reduce the heat input into a structure, FIG. 4 depicts the one-dimensional temperature profiles of a conventional bimetallic composite structure 38 compared with the system 10 of the invention. Composite structure 38 is fabricated out of the same materials as system 10; i.e., a stainless steel face sheet or foil 40 bonded, as by diffusion bonding, to an aluminum substrate 42. It can be seen from FIG. 4 how the blister formation in the riveted foil 12 of the invention produces an air space 36 that causes a temperature drop in the heat flowing through system 10 while the temperature profile through the composite 38 is substantially as if it were a homogenous mass.

Figure 2:
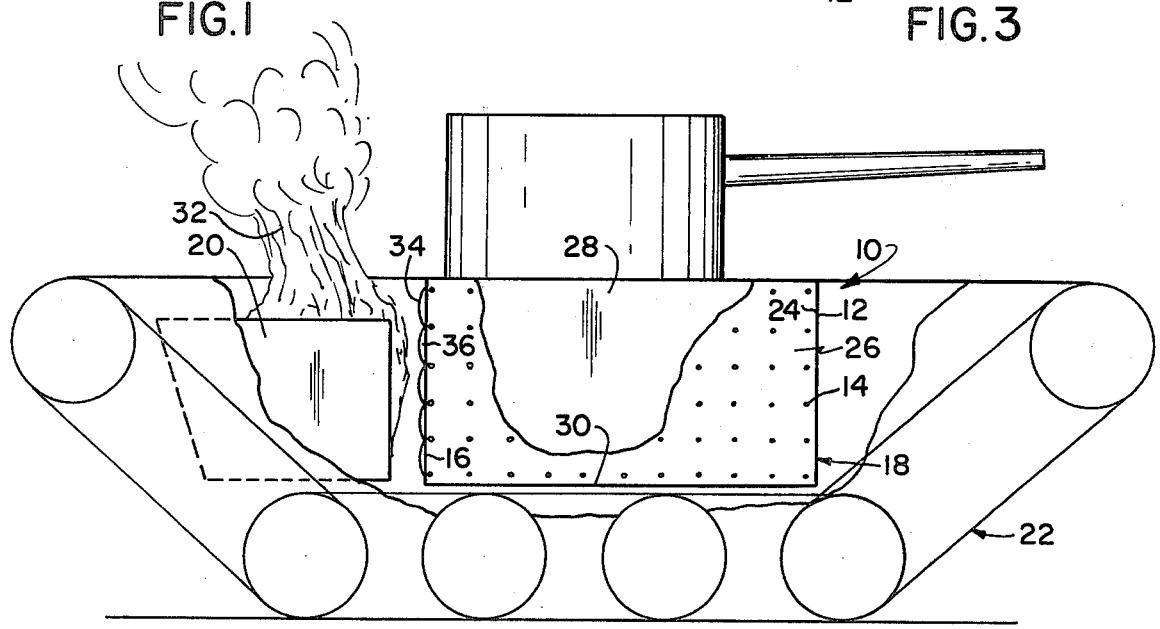
FIG. 2 is a schematic view with an area thereof partially cut away of the fire protection system of the invention incorporated in a vehicle.

In FIG. 2, protective foil 12 is shown as being fastened to the crew compartments walls by rivets 14 located in an evenly spaced pattern; however, as stated previously, the pattern and spacing of the fasteners can vary to fit the requirements. A time phased blister formation to enhance the protection offered when the heat input exceeds certain limits is obtainable in the system of the invention by the use of temperature-sensitive fasteners. A phased temperature protection is embodied in the system of the invention by the use of a pattern of fasteners in which selected fasteners are chosen such that they fail as a result of thermal stresses when a specified temperature is exceeded. For example, the centrally located fasteners in an array or pattern would have a thermally induced failure at a predetermined temperature whereby an added increment of thermal expansion of the protective foil at that location would increase the distance the foil bulges away from the structure to thereby enhance the protection afforded by the blister.

In tests of the invention in which a 0.008-inch thick AISI 301 stainless steel foil was used with a 0.125-inch thick 2024 aluminum alloy specimen, the data in Table I were obtained. The dimensions of the aluminum coupon that was used in the tests was 9 inch×11 inch and a 7¾ inch×11 inch foil coupon was riveted thereon by means of stainless steelrivets at each of the four corners. An acetylene torch was used as a heat source and the blister formed on the area directly heated had a diameter of about 4½ inches. Temperature measurements were by means of conventional instrumentation using thermocouples welded to the front face of the foil and on the back face of the aluminum on the centerline of the torch flame impingement.

TABLE I

| SPECIMEN ATTITUDE | HORIZONTAL | | | VERTICAL |
|---|---|---|---|---|
| d | 2 in. | 2.5 in. | 3 in. | 3 in. |
| $T_S$ | ≧2000 | ≧2000 | ≧2000 | ≧2000 |
| $T_F$ | 1900 max. | 2000 | 1800 | 1850 |
| $T_B$ | 250 max. | 182 | 250 | 175 |
| $T_A$* | 83 | 78 | 100** | — |
| t | 5 | 3+ | 17 | 5½ | d = Distance of torch from specimen
T = Temperature-degrees F.
$T_A$ = Ambient temperature
$T_B$ = Back face temperature
$T_F$ = Front face temperature
$T_S$ = Source temperature
t = Time-minutes It will be appreciated that with transitory heat inputs of even very high levels, the system will blister to protect the structure and will return to its original state after the heat is removed and will respond in the same manner to repeated exposures. If the system is exposed to high levels of heat for protracted periods, however, there will be a heat build-up that will put the structure being protected into jeopardy. To extend the capabilities of the system for heat inputs of longer duration, a layer of low density thermal insulating material (not shown) can be provided between the foil and the structure being protected. Because the foil provides the requisite structural support and protects against flame-induced erosion by shielding against direct flame impingement, a frangible insulation having low surface strength and cohesion is feasible. The term "low surface strength" is also intended to characterize a lack of sufficient strength for the material to be self-supporting. The insulating material used should be of a type that is sufficiently flexible to permit it to be compressed by the foil when the system is installed and yet it should have the necessary resiliency to expand to conform with the blister when the system is exposed to heat. A candidate thermal insulating material suitable for use is a metallic-covered compressible and extensible fabric insulation manufactured by Johns-Mansville Co., and sold under the trademark, Min-K.

In a further embodiment of the invention, the protective foil is fastened to the structure being protected by means of an adhesive or similar chemical bonding means. The adhesive used can be of any suitable type such as, for example, the adhesive marketed by Goodyear Tire and Rubber Co., Akron, Ohio, under the mark "Pliobond". The adhesive used must be characterized by the property of localized thermal failure or separation when a heat input causes the foil to blister at that location. To fasten the foil in place, the adhesive can be applied over the entire faying surface of the foil or structure or it can be applied in selected spots. As with mechanical fasteners, a time-phased blister formation enhancement can be obtained by the use of an adhesive in one area of the protection system having different thermal characteristics than the adhesive used in another area of the system.

It will be appreciated that, in addition to the fastening systems described above, other suitable means such as spot welding can be employed to fasten the foil to the structure being protected.

Although shown and described in what are believed to be the most practical and preferred embodiments, it is apparent that departures from the specific method and apparatus described will suggest themselves to those skilled in the art and may be made without departing from the spirit and scope of the invention. We, therefore, do not wish to restrict ourselves to the particular instrumentalities illustrated and described, but desire to avail ourselves of all modifications that may fall within the scope of the appended claims.

Having thus described our invention, what we claim is:

1. A passive fire protection system for a structure to be shielded against high rise rate thermal inputs consisting of a thin protective foil of heat resistant metallic material fixedly fastened in intimate contact with and conforming to the surface of said structure covering the areas thereof that have a liability of being exposed to high temperatures, the thermal expansion of said foil when subject to a high heat input forming a blister which bulges away from said structure and in the direction of the source of said heat such that an air space thermally insulating said structure is created.

2. The fire protection system defined in claim 1 wherein the foil ranges in thickness from about 0.005 to about 0.015 inch.

3. The fire protection system defined in claim 1 wherein the foil is fabricated out of a material having a higher resistance to hear than does the material from which the structure is fabricated.

4. The fire protection system defined in claim 1 wherein the fastening means is an adhesive.

5. The fire protection system defined in claim 1 wherein the protective foil is fastened to the structure with a pattern of spaced fastening means.

6. The fire protection system defined in claim 1 wherein the fastening means is spot welding.

7. The fire protection system defined in claim 1 wherein the foil is mechanically attached to said structure.

8. The fire protection system defined in claim 7 wherein the mechanical attachments are rivets.

9. The fire protection system defined in claim 8 wherein the rivets are fabricated out of a material contributing minimally to structure borne thermal conductivity.

10. The fire protection system defined in claim 1 wherein the protective foil is secured to the structure with fastening means located in a pattern, the physical characteristics of selected fastening means in said pattern being such that they fail at a predetermined temperature lower than the failing point of the remaining fastening means in said pattern, the failure of said selected fastening means freeing the foil associated therewith such that the unimpeded thermal expansion thereof increases the distance the blister bulges away from said structure whereby the thermal protection thereof above said predetermined temperature is increased accordingly.

11. The fire protection system defined in claim 1 wherein a layer of thermal insulating material is interposed between the protective foil and the face of the structure being protected.

12. The fire protection system defined in claim 11 wherein the thermal insulating material is of a resilient low-density type having a low surface strength and cohesion.

* * * * *